A. T. KILLIAN.
ROLLER BEARING.
APPLICATION FILED MAR. 6, 1915.

1,246,934.

Patented Nov. 20, 1917.

Inventor
Albert T. Killian
By Davis & Davis
Attorneys

Witnesses

UNITED STATES PATENT OFFICE.

ALBERT THOMAS KILLIAN, OF BUFFALO, NEW YORK.

ROLLER-BEARING.

1,246,934.   Specification of Letters Patent.   Patented Nov. 20, 1917.

Application filed March 6, 1915. Serial No. 12,702.

*To all whom it may concern:*

Be it known that I, ALBERT T. KILLIAN, a citizen of the United States of America, and a resident of Buffalo, in the county of Erie and State of New York, have invented certain new and useful Improvements in Roller-Bearings, of which the following is a full and clear specification, reference being had to the accompanying drawings, in which—

Figure 1:
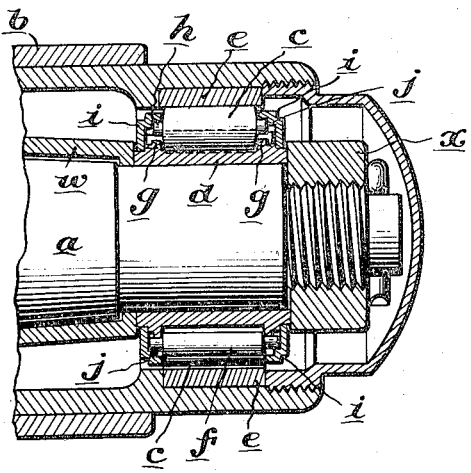
Figure 1 is a longitudinal sectional view of a portion of a hub and axle showing my invention adapted thereto.
Figure 2:
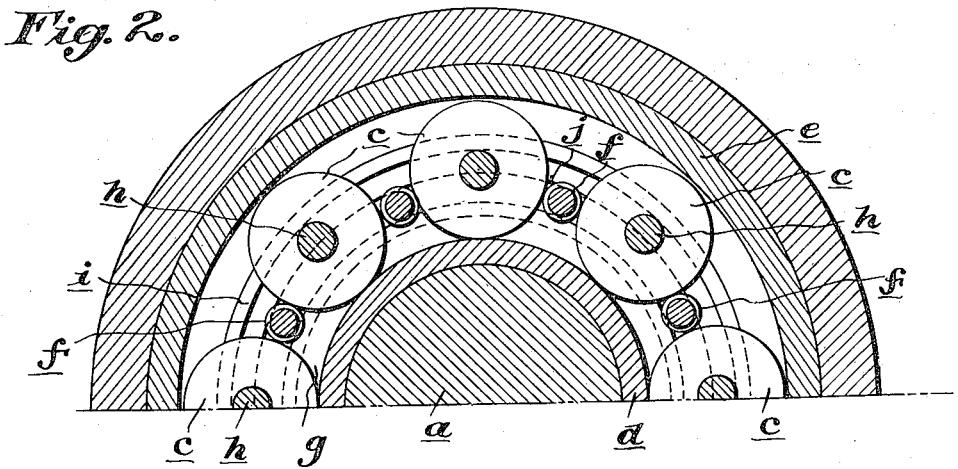
Fig. 2 is a transverse sectional view thereof on the line 2—2 of Fig. 1.
Figure 3:
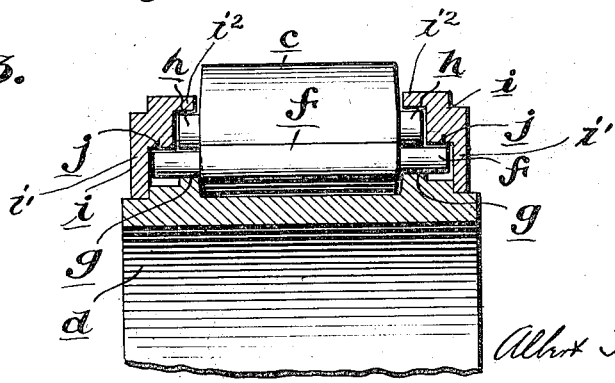
Fig. 3 is a detail longitudinal section on the line 3—3 of Fig. 2.

This invention relates to that class of radial or load-sustaining roller bearings in which is employed a series of larger load-sustaining rollers and an intermediate series of smaller spacing-rollers, and the object of this invention is to so construct the bearing that friction and wear will be reduced to a minimum and the assembling and disassembling of the parts rendered easy, as more fully hereinafter set forth.

Referring to the drawings by reference character, $a$ designates the stationary member of the bearing, which in the present instance, is a vehicle axle, and $b$ the rotary member, this being in the present instance a vehicle hub. The radial or load-sustaining bearing consists of a series of load-sustaining rollers $c$. These rollers bear upon an inner sleeve $d$ affixed to the axle and an outer sleeve $e$ removably set in the hub. Smaller spacing-rollers $f$ are mounted between the rollers $c$, the trunnions of these rollers resting upon annular flanges $g$ formed on the sleeve $d$.

The load rollers $c$ are provided with trunnions $h$, which, together with two annular caps $i$ removably affixed to the sleeve $d$, serve to hold the load-rollers in position during assembling as well as when outer member $b$ and its sleeve $e$ are removed. Each end cap consists of a radial plate $i'$ fitted on the end of the sleeve $d$ and provided with an annular circumferential flange $i^2$ projecting far enough laterally to overhang the trunnions $h$ of the load-rollers. Each cap is provided with an inwardly-projecting annular shoulder $j$ which overhangs the outer ends of the trunnions of the spacing-rollers and serves to confine the spacing-rollers not only during assembling but also after the bearing is put into use. It will be observed that the axes of the spacing-rollers are located nearer to the center of the bearing than the axes of the load-rollers; the object of this is to bring the lines of contact between the spacing-rollers and the load-rollers inside of a circle drawn through the axes of the load-rollers, so that all tendency of the load-rollers to thrust the spacing-rollers outwardly out of contact with the load-rollers is thereby eliminated.

In the operation of my bearing it will be seen that the trunnions of the load-rollers do not at any time contact with any part of the end caps $i$ or the annular flanges, while the small rollers in passing under the bearing roll on the inwardly-facing steps or shoulders $j$ of the end caps and on the annular flanges $g$ of the sleeve while they are passing over the top of the bearing.

It will be observed that the sleeve $d$ may be entirely removed from the bearing and carry with it both sets of rollers, the end cap serving to hold all the rollers in position, thus rendering cleaning and repairing an easy matter with my bearing. It will also be observed that the end caps have no contact with any of the moving parts of the bearing except at the points where the trunnions of the small rollers engage them while passing under the shaft or axle, although it is possible that under a high speed the centrifugal action will cause all the trunnions of the small rollers to contact with the end caps all the way around.

It will be observed also that the outer corners of the flanges $g$ are rabbeted or cut away so as to bring the working faces of the flanges to points inside of the bearing faces of the shoulders $j$ on the end caps, and that the trunnions of the spacing-rollers are sufficiently long to enable them to run either on the flanges $g$ or on the shoulders $j$, according to whether they are passing over the top of the bearing or around underneath the bearing. In other words, the working faces of the flanges $g$ and the shoulders $j$ are arranged out of alinement transversely of the bearing, thereby dividing the wear on the trunnions, thus increasing the life of the trunnions materially and lessening friction.

It will be observed also that the height of the annular flanges $g$ is important in that these flanges maintain the axes of the small rollers in proper position with respect to the load-rollers, these flanges serving to prevent the load-rollers forcing the small rollers radially inwardly out of contact with the load-rollers.

Having thus described my invention, what I claim is:

1. In a roller bearing, inner and outer members, the inner member being provided with a pair of annular flanges, an annular cap affixed to the inner member outside of each flange thereon and having an annular flange projecting inwardly over the adjacent annular flange of the inner member, each of these caps being provided with an inwardly-projecting shoulder $j$ whose working face faces radially inwardly, a series of load-rollers and a series of spacing-rollers each provided with trunnions and arranged substantially as set forth.

2. In a roller bearing, inner and outer members, the inner member being provided with a pair of annular flanges, an annular cap affixed to the inner member outside of each flange thereon and having an annular flange projecting laterally over the adjacent annular flange on the inner member, each of these caps being provided with an inwardly-projecting shoulder $j$ whose working face faces radially inwardly, a series of load-rollers and a series of smaller spacing-rollers each provided with trunnions and arranged substantially as set forth, the flanges on the inner member being out of alinement transversely with said working faces of the shoulders $j$ and the trunnions of the spacing-rollers being long enough to run on the flanges as well as upon the working faces of the shoulders.

3. In a roller bearing, inner and outer members, the inner member being provided with a pair of annular flanges, an annular cap affixed to the inner member outside of each flange thereon and having an annular flange projecting inwardly over the adjacent annular flange of the inner member, a series of load rollers and a series of spacing rollers, both provided with trunnions and arranged substantially as set forth.

In testimony whereof I hereunto affix my signature in the presence of two witnesses.

ALBERT THOMAS KILLIAN.

Witnesses:
   Geo. F. Schwarz,
   John J. Welsh.